United States Patent [19]

Katsuto et al.

[11] 4,341,837

[45] Jul. 27, 1982

[54] LAMINAR THERMOPLASTIC RESIN STRUCTURE

[75] Inventors: Takayuki Katsuto; Shunzo Endo; Hideaki Doi; Naohiro Murayama, all of Iwaki, Japan

[73] Assignee: Kureha Kagaku Kogyo Kabushiki Kaisha, Japan

[21] Appl. No.: 64,626

[22] Filed: Aug. 7, 1979

[30] Foreign Application Priority Data

Aug. 11, 1978 [JP] Japan ................................. 53-97217
Mar. 14, 1979 [JP] Japan ................................. 54-29796

[51] Int. Cl.³ ............................................. B32B 27/36
[52] U.S. Cl. .................................... 428/336; 156/327; 156/334; 428/476.1; 428/483; 428/355; 428/518; 428/519; 428/521; 428/412; 525/285
[58] Field of Search ................ 525/285; 156/327, 334, 156/500, 521; 428/476.1, 412, 483, 516, 517, 518, 519, 336, 355

[56] References Cited

U.S. PATENT DOCUMENTS

| | | | |
|---|---|---|---|
| 3,714,295 | 1/1973 | Nakayama | 525/285 |
| 3,922,473 | 11/1975 | Kosaka et al. | 525/285 |
| 3,970,771 | 7/1976 | Davison | 428/519 |
| 4,058,647 | 11/1977 | Inoue et al. | 428/476.1 |
| 4,123,576 | 10/1978 | Kobayashi et al. | 428/516 |

FOREIGN PATENT DOCUMENTS

| | | | |
|---|---|---|---|
| 2017894 | of 1970 | France | |
| 2375983 | 1/1977 | France | |
| 739634 | 11/1955 | United Kingdom | 525/285 |
| 1204730 | 9/1970 | United Kingdom | 525/285 |
| 1260871 | 1/1972 | United Kingdom | |

OTHER PUBLICATIONS

Information Chimie, No. 171, p. 355, Morris et al., Nov. 77.

*Primary Examiner*—George F. Lesmes
*Assistant Examiner*—E. Rollins Buffalow
*Attorney, Agent, or Firm*—Wenderoth, Lind & Ponack

[57] ABSTRACT

A laminar thermoplastic resin structure comprising a plurality of thermoplastic resin layers is obtained by bonding thermoplastic resin layers with a layer, or layers, of a maleic acid-modified block copolymer of a conjugated diene and an aromatic vinyl monomer interposed therebetween.

The laminar structure thus obtained possesses a high bonding strength at elevated temperatures, and also excellent processability since the bonding layer per se is of thermoplastic nature. Thus, this laminar structure is particularly suitable as a material for use at elevated temperatures, for example, a packaging material for retort sterilization or a pipe for conducting hot fluids.

7 Claims, 1 Drawing Figure

LAMINAR THERMOPLASTIC RESIN STRUCTURE

BACKGROUND OF THE INVENTION

The present invention relates generally to a laminar thermoplastic resin structure capable of retaining high bonding strength at elevated temperatures and more particularly to a laminar thermoplastic resin structure comprising a plurality of layers bonded with a layer or layers of a maleic acid-modified block copolymer interposed therebetween.

High bonding strength retentivity at elevated temperatures is desirable, for example, when a laminar structure is used as a food packaging material which is subjected to retort sterilization, particularly high temperature retort sterilization carried out at 130° C. or higher, or is required at joints of hot water pipes.

Most of the adhesives heretofore known to have satisfactory bonding strength at elevated temperatures are of thermosetting type such as polyurethane resin adhesives and epoxy resin adhesives. These adhesives leave much to be desired with respect to handling conditions.

As adhesives of thermoplastic type, on the other hand, those having noticeably reduced bonding strength at 100° C. or higher, such as styrene-butadiene block copolymers and ethylene-vinyl acetate copolymers, or those having excellent adhesiveness at high temperatures with respect limitedly to specific resins, for example, polycarbonates to polyesters have been used. However, thermoplastic adhesives possessing improved adhesiveness with respect to a wide variety of thermoplastic resins at high temperatures have not yet been developed as far as we are aware.

SUMMARY OF THE INVENTION

The main objects of the present invention are to provide a thermoplastic adhesive possessing improved adhesiveness with respect to a wide variety of thermoplastic resins at high temperatures, and to provide a novel laminar thermoplastic resin structure comprising thermoplastic resin layers bonded with this adhesive.

As a result of our research, it has been found that a block copolymer of an aromatic vinyl monomer and a conjugated diene modified with maleic acid possesses satisfactory high temperature adhesiveness with respect to a considerably wide variety of thermoplastic resins. The present invention is based on this discovery.

More specifically, the laminar thermoplastic resin structure according to the present invention comprises a plurality of thermoplastic resin layers, at least one adjacent pair of which is bonded with a layer of a maleic acid-modified block copolymer of a conjugated diene and an aromatic vinyl monomer having a maleic anhydride content of 0.1 to 10% (by weight, as in all percentages and parts set forth hereinafter).

DETAILED DESCRIPTION OF THE INVENTION

The maleic acid-modified block copolymer constituting the bonding layer of this invention is obtained by modifying the following first or unmodified block copolymer in the manner set forth hereinafter.

The unmodified block copolymer comprises a conjugated diene block and an aromatic vinyl monomer block, and includes straight chain block copolymers represented by the formula $(A-B)_{\overline{m}}A$, branched chain block copolymers represented by the formula $(A-B)_nX$, and mixtures thereof, wherein A is a polymerized block of an aromatic vinyl monomer, and B is a polymerized block of a conjugated diene and can contain trace amounts of the aromatic vinyl monomer which forms the A block.

For conjugated dienes, butadiene, isoprene, and 2,3-dimethylbutadiene, for example, are used, and, for aromatic vinyl monomers, styrene, vinyltoluene, tertiary butyl styrene, and vinylnaphthalene, for example, are used. A preferred combination of A and B is butadiene-styrene or isoprene-styrene.

The symbol m is 1 or 2, and the symbol n is an integer of from 2 to 8. If n exceeds 8 it becomes difficult to obtain the polymer $(A-B)_nX$.

The symbol X is a polyfunctional group binding n (A-B) chains at their B terminals which is the residue of polyfunctional compounds including bifunctional bonding agents such as $Br(CH_2)_n Br (n=1-4)$, $COCl_2$, $ClCH_2OCH_2Cl$ and $(CH_3)_2SiCl_2$, or polyfunctional bonding agents such as from which the reactive group, i.e., Br or Cl group in these cases, has been removed.

Accordingly, the formula $(A-B)_nX$ indicates, for example, the following polymers.

$$A-B-X-B-A, \quad A-B-X-B-A, \text{ and}$$

The aromatic vinyl content in the block copolymer must be in the range of from 10 to 70%, and is preferably from 12 to 50%. If the aromatic vinyl content is lower than the specified range, the cohesive force of the block copolymer is diminished, whereby the cohesion is liable to be destroyed. If the content is higher, the adhesive force of the copolymer is lowered.

The maleic acid-modified block copolymer of the present invention is obtained by reacting the unmodified block copolymer described above with a maleic anhydride compound.

The maleic anhydride compounds as herein referred to are compounds each represented by the formula:

wherein R is H, $CH_3$ or phenyl singly or in a mixture of two or more compounds.

The term "maleination" as used hereinafter refers to the reaction between the maleic anhydride represented by the above formula, in general, including maleic anhydride and the aforesaid unmodified block copolymer, and the term "maleinated product" or "maleinated block copolymer" refers to the product obtained.

The process of maleination per se is known and can be carried out, for example, by irradiation with light, by the use of radical initiators, by the exclusive use of heat, or by a combination thereof. The block copolymer used in the maleination can be in molten, dispersed or dissolved state.

Further, prior to or simultaneously with the maleination reaction of the block copolymer, oxygen may be allowed to coexist with a radical initiator. In this case, the block copolymer is used in dissolved state. The oxygen thus introduced may react with the block copolymer to cut the main chain, resulting in substantial reduction of the molecular weight of the block copolymer, and the polarity of the polymer may be varied due to the introduction of the group including oxygen into the polymer. The block copolymer obtained in the presence of oxygen has a lower melt viscosity and better bonding strength retentivity at elevated temperatures than that obtained in the absence of oxygen.

The quantity of the maleic anhydride compound to be used in the reaction is such that the content of the maleic anhydride compound in the maleic acid-modified block copolymer to be used as an adhesive will be 0.1 to 10%.

The maleic anhydride content as herein used is defined as % by weight of the maleic anhydride moiety obtained by substituting hydrogen for the group R in the maleic anhydride compound represented by the formula and combined with the polymer. In short, the maleic anhydride content is obtained as % by weight of the maleic anhydride combined with the maleic acid-modified block copolymer as calculated in terms of the content of maleic anhydride.

Figure 1:
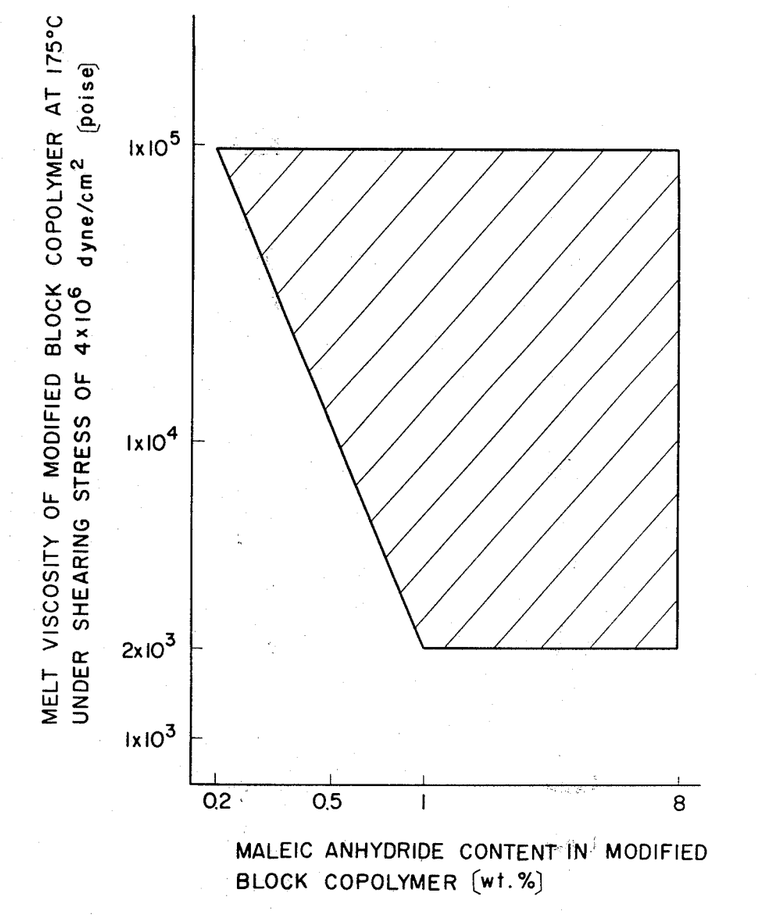
The FIGURE is a graph showing a preferred region of combinations of the maleic anhydride content in the maleic acid-modified block copolymer constituting the bonding layer according to the present invention and the melt viscosity thereof.

In order to achieve satisfactory adhesiveness at elevated temperatures and processability, it is preferable that the maleic anhydride content be 0.2 to 8%, and that the melt viscosity of the maleic acid-modified block copolymer be $1.0 \times 10^3$ to $1.0 \times 10^5$ poises at 175° C. under a shearing stress of $4.0 \times 10^6$ dyne/cm². More preferably, the maleic anhydride content in the maleic acid-modified block copolymer and the melt viscosity thereof should be in the region indicated by oblique hatching in FIG. 1.

The maleic anhydride compound content as defined above is determined at the stage where the maleic acid-modified block copolymer used as an adhesive has its anhydride structure with respect to the maleic anhydride compound moiety combined therewith. Irrespective of whether the maleic acid-modified block copolymer is further modified as set forth hereinlater to have a dicarboxylic acid structure, a half ester structure, or a structure into which ionic bonds have been introduced by adding metal compounds, the maleic anhydride content therein represents a value as calculated in terms of the content of maleic anhydride. Thus, the maleic anhydride content shows a value not different from that obtained with an anhydride structure regardless of the modification of the anhydride structure.

The maleic anhydride content is determined by infrared absorption spectrophotometry as follows.

A styrene-maleic anhydride alternating copolymer having a styrene/maleic anhydride molar ratio of 1:1 is prepared as a standard sample. Given quantities of this standard sample are respectively admixed with an unmodified block copolymer prior to maleination to produce several samples for calibration. The ratio between the C=O absorbance of the maleic anhydride moiety (1780 cm⁻¹) and the characteristic absorbance of the aromatic vinyl moiety (1600 cm⁻¹ for styrene) in the unmodified block copolymer is determined for each sample for calibration. Then a calibration curve showing the relationship between the absorbance ratio and the content of the maleic anhydride (% by weight) combined with the polymer is drawn.

Separately, the absorbance ratio is determined for samples to be measured, each of which is a block copolymer maleinated with a maleic anhydride compound and has an anhydride structure, and the maleic anhydride content is obtained from the calibration curve thus drawn.

The maleinated block copolymer thus obtained, having acquired excellent adhesiveness with respect to various thermoplastic resins at elevated temperatures, can be used as an adhesive as it is. However, a maleinated block copolymer wherein the anhydride structure has been converted into a dicarboxylic acid structure, for example, by a hot water treatment or an alkali treatment combined with a subsequent acid treatment or a half ester or partially esterified product of the maleinated block copolymer obtained by reacting the one having an anhydride structure or a dicarboxylic acid structure with an alcohol such as methanol or ethanol can also be used as the maleic acid-modified block copolymer.

Further, the maleic acid-modified block copolymer can be a mixture of 100 parts of a maleinated product, and up to 10 parts, preferably up to 5 parts, and more preferably 0.001 to 3 parts, of at least one metal compound selected from the group consisting of oxides, hydroxides, organic acid salts and alkoxides of mono- or divalent metals. By adding these metal compounds, ionic bonds are introduced whereby the high temperature adhesive property of the copolymer is further improved.

This ionic bond introduction reaction or ionic cross-linking can be carried out by a known process, and a maleinated block copolymer wherein the anhydride structure has been converted to a carboxyl group or a half ester prepared therefrom prior to the introduction of ionic bonds can also be used.

Examples of the metal compounds are sodium hydroxide, magnesium acetate, formates such as zinc formate and magnesium formate, oxides such as zinc oxide, and alkoxides such as sodium methoxide and sodium ethoxide.

The quantity of the metal compound to be added is limited within the range specified above because a greater quantity of the metal compound results in too high a melt viscosity and hence reduces adhesiveness of the product.

Needless to say, additives such as antioxidants and stabilizers can be added, if desired, to the maleic acid-modified block copolymer.

For thermoplastic resin layers which can be bonded at high temperatures with the above described modified block copolymer, layers of at least one resin selected from the group consisting of polyvinylidene chloride resins, polyvinyl chloride resins, polyolefin resins, polyamide resins, polyester resins, polycarbonate resins, and poly-unsaturated nitrile resins can be used. The polyvinylidene chloride resin as herein referred to comprise a copolymer predominantly comprising vinylidene chloride and various optional additives including plasticizers.

The polyvinyl chloride resin includes a vinyl chloride homopolymer, a copolymer predominantly comprising vinyl chloride, a modified product such as a post-chlorinated product thereof, or a mixture thereof.

Examples of typical polyolefin resins are polyethylene resins and polypropylene resins, a preferred polyethylene resin being polyethylene, a copolymer predominantly comprising ethylene, an ionically cross-linked ethylene copolymer, or a saponified ethylenevinyl acetate copolymer, and a preferred polypropylene resin being polypropylene or a copolymer predominantly comprising propylene.

Examples of suitable polyamide resins are 6,6-nylon, 6-nylon, 12-nylon, and nylon 6/66 copolymers; examples of suitable polyester resins are polyethylene terephthalate, polycyclohexylene, and 1,4-dimethylene terephthalate; and examples of polycarbonate resins are bisphenol A polycarbonates.

For the poly-unsaturated nitrile resins, nitrile copolymers comprising, as the principal constituent, ordinarily 50% or more of, a nitrile monomer selected from acrylonitrile and methacrylonitrile, or those modified with rubbers can be used. For the nitrile copolymer as herein referred to, a copolymer of a nitrile monomer and one monomer or a mixture of monomers copolymerizable therewith, such as methyl acrylate, ethyl acrylate, butyl acrylate, methyl methacrylate, vinyl acetate, methyl vinyl ether, styrene, α-methyl styrene, and isobutylene, is preferably used. For the rubber-modified nitrile copolymer, a rubber-graft copolymer obtained by graft-polymerizing a monomer mixture which provides the aforementioned nitrile copolymer onto a rubbery polymer containing a conjugated diene such as butadiene or isoprene, for example, polybutadiene, butadiene-styrene rubber, butadiene-acrylonitrile rubber or butadiene-methyl methacrylate rubber, a butadiene-acrylate copolymer, or a butadiene-styrene-acrylate copolymer, or a blend of the nitrile copolymer and the rubber-graft copolymer is preferably used. Foamed resin sheets of the above mentioned thermoplastic resins obtained by a conventional process may also be used as thermoplastic resin layers.

It may be advantageous to use a poly-unsaturated nitrile resin as at least one of the thermoplastic resin layers constituting the adjacent pair of layers bonded with the maleic acid-modified block copolymer described above.

Notwithstanding that the nitrile resins per se have excellent airtightness, water resistance and oil resistance and thus are remarkably suitable as packaging materials for retort sterilization to be used at a high temperature or as hot water pipe materials, the utility thereof as a laminate material has been limited because there has been no adequate thermoplastic resin adhesive possessing an excellent adhesiveness at elevated temperatures.

The maleic acid-modified block copolymer according to the present invention possesses excellent adhesiveness, particularly at elevated temperatures, which ensures bonding between nitrile resin layers or between a nitrile resin layer and a layer of another thermoplastic resin, thus providing, in combination with nitrile resin layers, a laminate material with excellent high temperature properties.

Lamination of the thermoplastic resin layers and the maleic acid-modified block copolymer can be carried out by any of conventional processes, for example, by forming the respective resins into films by melt forming or like methods, superposing the films thus obtained, and then forming the superposed films under heat and pressure, or by co-extrusion such as lamination within a die or outside a die. Whatever forming method is employed, not all of the thermoplastic resins need be in molten state, but only the bonding layer may be in molten state. Further, while it is generally preferable that the bonding layer and the thermoplastic resin layers are laminated over the entire surfaces, it is even possible to control the bonding strength by laminating the layers so that either one of them will cover a smaller area. The bonding layer, in general, has a thickness of 0.1 to 1,000 μm, preferably 0.5 to 500 μm, and the thermoplastic resin layers to be bonded therewith can have any thickness.

As is apparent from the foregoing description and Examples set forth hereinlater, the maleic acid-modified block copolymer used in this invention not only has a high bonding strength at ambient temperatures, but also exhibits a remarkable bonding strength with respect to many types of thermoplastic resins at high temperatures, for example, 130° to 140° C.

The laminar structure according to the present invention possesses excellent water resistance and oil resistance, and therefore is preferably used as a packaging material for high retort sterilization or as a pipe for transporting hot water or high temperature liquids and gases. Furthermore, since the modified block copolymer constituting the bonding layer is of thermoplastic nature, lamination can be carried out, for instance, by co-extrusion with other thermoplastic resins or by hot press forming. The laminar structure thus obtained can be processed and formed far more easily than prior art laminar structures of which high bonding strength retentivity at elevated temperatures is required. Furthermore, laminar structures of various shapes such as films, sheets, plates, bottles and tubes can be obtained from the laminar structure of this invention.

In order to indicate more fully the nature and utility of this invention, the following specific examples of practice constituting preferred embodiments of the invention and comparison examples are set forth, it being understood that these examples are presented as illustrative only and not intended to limit the scope of the invention.

EXAMPLE 1

60 g of a styrene-butadiene-styrene block copolymer (hereinafter abbreviated to SBS) prepared in benzene as a solvent in the presence of an n-butyl lithium catalyst and having a butadiene/styrene weight ratio of 67.5/32.5 and a reduced viscosity $\eta_{sp}/C$ of 0.75 dl/g in toluene at a concentration of 4 g/l at 25° C., and 1.5 kg of toluene were charged into a 5-l separable flask. The reaction mixture was heated to 90° C. in a nitrogen atmosphere to obtain a solution of the block copolymer. To this solution were added 4.5 g of maleic anhydride and then 0.3 g of benzoyl peroxide, and the mixture was allowed to react for 4 hours. 400 ml of dimethylformamide containing 0.3 g of zinc acetate (dihydrate) dissolved therein was further added to the reaction system, and the resulting solution was agitated for 3 hours at 80° C.

The solution thus obtained was poured into methanol to precipitate the resulting polymer. This polymer was washed with methanol at room temperature. To the polymer thus washed a small quantity of a phenol antioxidant was added, and the mixture was thereafter subjected to vacuum drying at 45° C.

The maleinated and ionically crosslinked SBS obtained was found to have a maleic anhydride content of 2.4% as measured by the aforesaid infrared absorption spectrophotometry.

The melt viscosities of the unmodified SBS and the maleinated and ionically crosslinked SBS, as measured by a Melt Tension Tester (trade name, mfd. by Toyo Seiki K.K.) provided with a nozzle of an inner diameter of 1 mm and a length of 3 mm, were $3 \times 10^3$ poise and $8 \times 10^4$ poise respectively at 175° C. under a shearing stress of $4 \times 10^6$ dyne/cm$^2$.

Various laminar polymer sheets as shown in Table 1 were prepared from laminar resin structures each comprising a bonding layer of the maleinated and ionically crosslinked SBS obtained as described above and control laminar resin structures each comprising a bonding layer of an unmodified SBS. The lamination of each polymer sheet was carried out by interposing a sheet of a maleinated and ionically crosslinked SBS or an unmodified SBS between sheets of the same polymer or dissimilar polymers and subjecting the superposed polymer sheets to hot press forming. When a vinylidene chloride-vinyl chloride copolymer was used as a material for the thermoplastic resin layer to be bonded, the hot press forming was carried out under the conditions of preheating for 1 min. at 170° C. and pressing for 0.5 min. under a pressure of 50 kg/cm$^2$, and, when other polymers were used as such, the hot press forming conditions included preheating for 1 min. at 200° C. and pressing for 0.5 min. under a pressure of 50 kg/cm$^2$.

In Tables 1 through 5 and Examples 1 through 5: PP is polypropylene manufactured by Sumitomo Kagaku K. K. under the trade name "Sumitomo Noblen W-111"; PVDC is a vinylidene chloride-vinyl chloride copolymer obtained by incorporating 3% of a plasticizer in a copolymer having a vinylidene chloride/vinyl chloride weight ratio of 80/20; PC is a polycarbonate manufactured by Teijin K. K. under the trade name "Teijin Panlite"; nylon is that manufactured by Unichika under the trade name "Unichika Nylon 6"; EVAL is a saponified ethylene-vinyl acetate copolymer manufactured by Kuraray K. K. under the trade name "Eval Film" (100μ in thickness); and PVC is polyvinyl chloride manufactured by Kureha Kagaku Kogyo K. K. under the trade name "S-901" to which 2 parts of an organotin stabilizer has been added.

These thermoplastic resin layers were obtained by press-forming PP and PVC at 200° C., PVCD at 170° C., nylon at 250° C., and PC at 280° C. The bonding layer was obtained by press forming at 200° C.

The laminar polymer sheets prepared from the above resins as shown in Table 1 were cut into strips of 1-cm width. Each of the test specimens thus prepared was subjected to Trousers-type peeling test by using a tensile strength tester (trade name: Tensilon, mfd. by Toyo Sokki K. K.) at a speed of 200 mm/min. at varying temperatures to evaluate the peeling strength thereof.

The results obtained are summarized in Table 1.

The thicknesses of the respective layers of the laminar sheets in Table 1 were as follows.
Bonding layer (maleinated and ionically crosslinked SBS and unmodified SBS): 400μ.
Thermoplastic resin layer: EVAL—100μ; Other resins—500μ.

TABLE 1

| | | Lamination Structure | Peeling Strength (g/cm) | | | | |
|---|---|---|---|---|---|---|---|
| | | | 23° C. | 80° C. | 100° C. | 120° C. | 140° C. |
| Control 1 - 1 | PVDC/ | unmodified SBS/ PVDC | 800 | — | 60 | 25 | — |
| Example 1 - 1 | PVDC/ | modified* SBS/ PVDC | 800 | — | 230 | 100 | — |
| Control 1 - 2 | PC/ | unmodified SBS/ PC | 450 | 270 | 50 | 20 | — |
| Example 1 - 2 | PC/ | modified* SBS/ PC | 4000 | 1300 | 680 | 620 | 270 |
| Contro 1 - 3 | EVAL/ | unmodified SBS/ EVAL | 380 | 250 | 45 | 10 | — |
| Example | EVAL/ | modified* SBS/ EVAL | — | 900 | 660 | 300 | 340 |

TABLE 1-continued

| | Lamination Structure | Peeling Strength (g/cm) | | | | |
|---|---|---|---|---|---|---|
| | | 23° C. | 80° C. | 100° C. | 120° C. | 140° C. |
| Control 1-3 | nylon/ unmodified SBS/ nylon | 1400 | 450 | 70 | 15 | — |
| Example 1-4 | nylon/ modified* SBS/ nylon | >5000 | 1700 | 1000 | 370 | 500 |
| Control 1-4 | nylon/ unmodified SBS/ PP | 500 | 100 | 25 | — | — |
| Example 1-5 | nylon/ modified* SBS/ PP | 750 | 150 | 160 | 350 | 50 |
| Control 1-5 | nylon/ unmodified SBS/ PVC | 350 | 450 | 50 | — | — |
| Example 1-6 | nylon/ modified* SBS/ PVC | 1700 | 500 | 410 | 100 | 35 |

*Modified SBS means the maleinated and ionically crosslinked SBS.

EXAMPLE 2

60 g of a styrene-butadiene-styrene block copolymer prepared in benzene as a solvent in the presence of a n-butyl lithium catalyst and having a butadiene/styrene weight ratio of 68/32 and $\eta_{sp}/C$ of 0.72 dl/g in a toluene solution at a concentration of 4 g/l, and 1.5 kg of toluene were charged into a 2-l separable flask. The reaction mixture was heated to 90° C. in a nitrogen atmosphere to obtain a solution of the block copolymer. To this solution were added 3 g of maleic anhydride and then 0.3 g of benzoyl peroxide, and the mixture was allowed to react for 4 hours.

Half of the reaction product solution was taken out of the flask, and poured into methanol to precipitate the resulting polymer. This polymer was subjected to the same post-treatments as those applied in Example 1 to obtain a maleinated SBS.

To the remaining solution was added 200 ml of dimethylformamide containing 0.15 g of zinc acetate (dihydrate) dissolved therein, and the resulting solution was agitated for 3 hours at 80° C. to obtain a maleinated and ionically crosslinked SBS.

The melt viscosities of an unmodified SBS, the maleinated SBS and the maleinated and ionically crosslinked SBS as measured in the same manner as in Example 1 were $2.5 \times 10^3$ poise, $2.2 \times 10^4$ poise and $2.9 \times 10^4$ poise, respectively, at 175° C. under a shearing stress of $4 \times 10^6$ dyne/cm$^2$. The maleic anhydride content in the maleinated SBS as measured similarly as in Example 1 was 1.9%.

Laminar polymer sheets as shown in Table 2 were prepared in the same manner as in Example 1 by using the maleinated SBS and the maleinated and ionically crosslinked SBS vs. an unmodified SBS as a control, and the peeling strengths thereof were similarly evaluated.

The results are set forth in Table 2, in which PET denotes polyethylene terephthalate manufactured by Toray K. K. under the trade name "Lumilar" sheet (250μ in thickness), and the other materials are the same as those used in Example 1.

The thickness of PET layer was 250μ, and those of the other resin layers were the same as in Example 1.

TABLE 2

| | Lamination Structure | Peeling Strength (g/cm) | | | | |
|---|---|---|---|---|---|---|
| | | 23° C. | 80° C. | 100° C. | 120° C. | 140° C. |
| Control 2-1 | PC/ unmodified SBS/ nylon | 400 | 250 | 40 | 15 | — |
| Example 2-1 | PC/ maleinated SBS/ nylon | 2100 | 1800 | 430 | 140 | 200 |
| Example 2-2 | PC/ maleinated & ionically crosslinked SBS/ nylon | 1800 | 1600 | 450 | 160 | 300 |
| Control 2-2 | nylon/ unmodified SBS/ EVAL | 350 | 220 | 40 | — | — |
| Example 2-3 | nylon/ maleinated SBS/ EVAL | 1000 | 950 | 190 | 60 | 140 |
| Example 2-4 | nylon/ maleinated & ionically crosslinked SBS/ EVAL | >1000 | 800 | 190 | 200 | 160 |
| Example 2-5 | nylon/ maleinated & ionically crosslinked SBS/ PET | 1600 | 1050 | 200 | 60 | 70 |

EXAMPLE 3

60 g of "Califlex TR-1102" (trade name, a styrene-butadiene-styrene block copolymer having a butadiene/styrene weight ratio of 72/28, manufactured by Shell Chemical Co.) and 1.5 kg of toluene were charged into a 5-l separable flask. The reaction mixture was heated to 90° C. in a nitrogen atmosphere to obtain a solution of the block copolymer. To this solution were added 3 g of maleic anhydride and then 0.3 g of benzoyl peroxide, and the mixture was allowed to react for 4 hours.

The reaction product solution was subjected to the same post-treatments as those applied in Example 1 to obtain a maleinated SBS. The resulting maleinated SBS was found to have a maleic anhydride content of 1.6% and a melt viscosity of $4.5 \times 10^4$ poise as measured under the same conditions as those employed in Example 1. In contrast, the unmodified SBS was found to have a melt viscosity of $1 \times 10^4$ poise.

Laminar polymer sheets as shown in Table 3 were prepared from PVDC (the same vinylidene chloride-vinyl chloride copolymer as was used in Example 1) and PP (the same polypropylene as was used in Example 1) with the maleinated and unmodified SBS's being interposed therebetween as bonding layers.

These laminar sheets were obtained by laminating the bonding layer first with PP at 200° C. under the conditions of preheating for 1 min. and pressing for 0.5 min. under a pressure of 50 kg/cm² and then with PVDC at 170° C. under the same preheating and pressing conditions except for the temperature.

The laminar sheets thus obtained were tested for peeling strength by the procedure of Example 1.

The results are set forth in Table 3.

TABLE 3

|  |  | Lamination Structure | Peeling Strength (g/cm) | | | |
|---|---|---|---|---|---|---|
|  |  |  | 23° C. | 80° C. | 100° C. | 120° C. |
| Control 3-1 | PVDC/ | unmodified SBS/ PP | 1300 | 250 | 80 | 30 |
| Example 3-1 | PVCD/ | maleinated SBS/ PP | 2400 | 260 | 100 | 300 |

EXAMPLE 4

In a Pyrex reactor and in a nitrogen atmosphere, 26 g of the same SBS as was used in Example 3 was dissolved in 480 g of methyl isobutyl ketone, 110 g of acetone and 30 g of toluene at 42° C., to which 1.3 g of maleic anhydride was added.

Into the solution thus obtained was inserted a mercury lamp (for physicochemical use, manufactured by Toshiba K.K. under the model name "SHL 100 UV") placed in a quartz double tube, and the solution was irradiated with light from the mercury lamp for 2 hours under agitation to cause a reaction.

The reaction product solution was poured into methanol to precipitate the resulting polymer. The polymer thus precipitate was subjected to post-treatments in the same manner as in Example 1 to obtain a maleinated SBS having a maleic anhydride content of 1.1%. The melt viscosity of this maleinated SBS as measured under the same conditions as those in Example 1 was $7.5 \times 10^4$ poise.

Laminar sheets as shown in Table 4 were prepared by interposing this maleinated SBS and the unmodified SBS as bonding layers between layers of PP as in the preceding Examples.

The peeling strengths of these laminar sheets were as shown in Table 4.

TABLE 4

|  |  | Lamination Structure | Peeling Strength (g/cm) | | | | |
|---|---|---|---|---|---|---|---|
|  |  |  | 23° C. | 80° C. | 100° C. | 120° C. | 140° C. |
| Control 4-1 | PP/ | unmodified SBS/ PP | 1000 | 580 | 80 | 10 | — |
| Example 4-1 | PP/ | maleinated SBS/ PP | 1000 | 590 | 320 | 120 | 80 |

EXAMPLE 5

30 g of "Solprene 418" (trade name, a branched-chain styrene-isoprene block copolymer having an isoprene/styrene weight ratio of 85/15, manufactured by Phillips Chemical Co.) was dissolved in 750 g of toluene and heated to 90° C. in a nitrogen atmosphere. To the solution obtained were added 1.5 g of maleic anhydride and then 0.15 g of benzoyl peroxide, and the mixture was allowed to react for 4 hours at 90° C.

Half of the reaction product solution was taken out and subjected to post-treatments in the same manner as in Example 1, whereupon a maleinated block copolymer having a maleic anhydride content of 1.8% was obtained.

To the remaining solution was added 100 ml of dimethylformamide containing 75 mg of zinc acetate (dihydrate) dissolved therein, and the resulting solution was agitated for 3 hours at 80° C. to obtain a maleinated and ionically crosslinked SBS.

The melt viscosities of the unmodified block copolymer, the maleinated block copolymer and the meleinated and ionically crosslinked block copolymer at 175° C. under a shearing stress of $4 \times 10^6$ dyne/cm² were $4 \times 10^3$ poise, $3.3 \times 10^3$ poise and $3.7 \times 10^3$ poise, respectively.

Laminar sheets were prepared in the manner described in Example 1 by interposing these block copolymers as bonding layers between layers of PP and nylon (the same one as was used in Example 1).

The results of the measurement of the peeling strengths of the laminar sheets are shown in Table 5.

TABLE 5

|  |  | Lamination Structure |  | Peeling Strength (g/cm) | | | | |
|---|---|---|---|---|---|---|---|---|
|  |  |  |  | 23° C. | 80° C. | 100° C. | 120° C. | 140° C. |
| Control 5-1 | PP/ | unmodified block co-polymer | /nylon | 2500 | 530 | 65 | 10 | — |
| Example 5-1 | PP/ | maleinated block co-polymer | /nylon | 3500 | 750 | 150 | 95 | 30 |
| Example 5-2 | PP/ | maleinated & ionically cross-linked block co- | /nylon | 3500 | 750 | 280 | 220 | 130 |

TABLE 5-continued

| Lamination Structure | Peeling Strength (g/cm) | | | | |
|---|---|---|---|---|---|
| | 23° C. | 80° C. | 100° C. | 120° C. | 140° C. |
| polymer | | | | | |

EXAMPLE 6

800 ml of purified benzene was charged into a 1-l glass autoclave under high-purity nitrogen atmosphere, and heated to 55° C. 1.5 ml of 15% n-butyl lithium solution in n-hexane was added to the benzene, and 15 g of styrene was further added thereto. The resulting solution was subjected to polymerization for 3 hours. To the reaction product was added 62 g of butadiene, and the mixture was further subjected to polymerization for 4 hours. Then, 15 g of styrene was added to the resulting polymer, and polymerization was continued for another 4 hours.

The solution of the SBS block copolymer thus obtained was poured into methanol to precipitate the resulting polymer. The post-treatments carried out in Example 1 were followed to obtain an SBS block copolymer.

20 g of this SBS block copolymer having a butadiene/styrene weight ratio of 67.4/32.6 and 1.0 g of maleic anhydride were dissolved in 500 g of toluene. The resultant solution was heated to 90° C., after which 0.1 g of benzoyl peroxide was added, and the mixture was allowed to react for 4 hours.

The solution thus obtained was poured into methanol to precipitate the resulting polymer. This polymer was subjected to post-treatments in the manner described in Example 1 to obtain a maleinated SBS.

The melt viscosity of this maleinated SBS as measured under the same conditions as in Example 1 was $6.5 \times 10^3$ poise at 175° C. under a shearing stress of $4.0 \times 10^6$ dyne/cm$^2$, and the maleic anhydride content therein was 1.6%.

Subsequently, 300 g of a styrene-isoprene-styrene block copolymer having an isoprene/styrene weight ratio of 86/14 (manufactured by Shell Chemical Co. under the trade name "Califlex TR-1107", hereinafter abbreviated to SIS), 22.5 g of maleic anhydride and 8.5 l of toluene were charged into a 4-necked round bottom flask of an effective capacity of 15.5 l through which nitrogen gas was slowly passed while the reaction mixture was agitated thereby to purge the atmosphere within the flask. The introduction of the nitrogen gas was stopped when the gaseous phase oxygen concentration reached 4.0%, and a rubber bag was fixed to the flask. At this stage, the dissolved oxygen in the liquid phase (as measured by means of a dissolved oxygen analyzer amnufactured by Toshiba Beckmann K.K.) was 158 ml, and the total quantity of oxygen in the gaseous and liquid phases was 1.3 ml per gramme of the polymer as recalculated under normal conditions.

This mixture was heated to 90° C., and 1.5 g of benzoyl peroxide dissolved in a small quantity of toluene was added by means of a syringe through a rubber plug inserted to stop a neck pipe. The resulting mixture was allowed to react for 4 hours at 90° C.

The solution obtained was poured into methanol to precipitate the resulting polymer, which was then subjected to post-treatments in the same manner as in Example 1 to obtain a maleinated SIS. The melt viscosity of this maleinated SIS at 175° C. under a shearing stress of $4 \times 10^6$ dyne/cm$^2$ was $1.5 \times 10^4$ poise, and the maleic anhydride content therein was 2.9%.

Various laminar polymer sheets as shown in Table 6 were prepared by using as bonding layers the maleinated SBS and the maleinated SIS obtained as described above and an unmodified SBS (the same block copolymer as was used in Example 3, manufactured by Shell Chemical Co. under the trade name "Califlex TR-1102") as a control. The lamination was carried out by hot press forming under the same conditions as in Example 1.

The peeling strengths of these laminar sheets as measured in the manner described in Example 1 were as set forth in Table 6.

The abbreviations in Table 6 other than those used hereinabove respectively indicate the following resins.

KBR: Nitrile copolymer comprising 80 parts of a copolymer having an acrylonitrile/methyl acrylate molar ratio of 3:1 and 20 parts of (butadiene/methyl methacrylate) (acrylonitrile/ethyl acrylate) graft copolymer. (mfd. by Kureha Kagaku Kogyo, K.K.)

KBR-B: Copolymer having an acrylonitrile/methyl acrylate molar ratio of 3:1. (mfd. by Kureha Kagaku Kogyo, K.K.)

Foamed KBR: Foam obtained by adding 1% of water to KBR and processing the mixture by pellet extrusion.

PP: Polypropylene. ("Noblen FB-3" mfd. by Mitsubishi Petrochemical Co., Ltd.)

Nylon: "Unichika Nylon 6" (mfd. by Unichika)

PVC: Polyvinyl chloride obtained by adding 2.8 parts of a composite lead stabilizer (mfd. by Sakai Kagaku, K.K. under the trade name "OW-541") to a polyvinyl chloride (mfd. by Kureha Kagaku Kogyo, K.K. under the trade name "S-901") and processing the mixture by pellet extrusion.

These resins were formed into press sheets under the press forming conditions of preheating at 200° C. (250° C. for nylon) for 2 min. and pressing under 100 kg/cm$^2$ for 1 min. The thickness of each sheet thus obtained was 0.2 mm, the thickness of the layer of the maleinated SBS, unmodified SBS or maleinated SIS being 0.07 mm.

TABLE 6

| | | Lamination Structure | | Peeling Strength (g/cm) | | |
|---|---|---|---|---|---|---|
| | | | | 23° C. | 120° C. | 135° C. |
| Control 6-1 | PP/ | unmodified SBS | /KBR | 267 | 6 | 3 |
| Example 6-1 | PP/ | maleinated SBS | /KBR | 306 | 28 | 27 |
| Example 6-2 | PP/ | maleinated SIS | /KBR | 330 | 41 | 41 |
| Control 6-2 | PP/ | unmodified SBS | foamed /KBR | 200 | 3 | — |
| Example 6-3 | PP/ | maleinated SBS | foamed /KBR | 300 | 25 | — |
| Control | nylon/ | unmodified SBS | /KBR | 490 | 3 | 4 |

TABLE 6-continued

| | | Lamination Structure | | Peeling Strength (g/cm) | | |
|---|---|---|---|---|---|---|
| | | | | 23° C. | 120° C. | 135° C. |
| Example 6-3 | nylon/ | maleinated SIS | /KBR | 758 | 59 | 54 |
| Control 6-4 | PVC/ | unmodified SBS | /KBR | 315 | 5 | 2 |
| Example 6-4 | PVC/ | maleinated SIS | /KBR | 652 | 53 | 49 |
| Control 6-5 | PP/ | unmodified SBS | /KBR-B | 249 | 4 | 6 |
| Example 6-6 | PP/ | maleinated SBS | /KBR-B | 301 | 28 | 26 |

EXAMPLE 7

Maleinated SIS samples were prepared substantially in the manner set forth in Example 6 except that the total quantity of oxygen in the gaseous and liquid phases was 5.1 ml per gramme of the polymer as recalculated under normal conditions. The melt viscosity of each of the maleinated SIS samples at 175° C. under a shearing stress of $4 \times 10^6$ dyne/cm$^2$ was $3.0 \times 10^3$ poise, and the maleic anhydride content therein was 2.3%.

Laminar sheets composed of layers of PP (the same as that of Example 6), and bonding layers of the maleinated SIS obtained as described above and the unmodified SBS and maleinated SBS used in Example 6 respectively interposed therebetween were processed by co-extrusion under the following conditions.

| Extruder caliber | 25 mm for bonding layer |
| --- | --- |
| | 35 mm for PP layer |
| Cylinder base temperature | 110° C. for bonding layer |
| | 180° C. for PP layer |
| Cylinder intermediate temperature | 145° C. for bonding layer |
| | 200° C. for PP layer |
| Cylinder tip temperature | 165° C. for bonding layer |
| | 230° C. for PP layer |
| T-die temperature for co-extrusion | 220° C. |

In this manner, T-die sheets each comprising PP layers 100μ in thickness and a bonding layer 30μ or 1μ in thickness were obtained.

The peeling strengths of these T-die sheets were measured under the same conditions as in Example 1 at varying temperatures. The results are summarized in Table 7.

TABLE 7

| | | Lamination Structure | | Peeling Strength (g/cm) | | |
|---|---|---|---|---|---|---|
| | | | | 23° C. | 120° C. | 135° C. |
| Control 7-1 | PP/ | unmodified SBS (30μ) | /PP | 495 | 2 | 2 |
| Example 7-1 | PP/ | maleinated SIS (30μ) | /PP | 612 | 82 | 71 |
| Example 7-2 | PP/ | maleinated SBS (30μ) | /PP | 598 | 51 | 42 |
| Control 7-2 | PP/ | unmodified SBS (1μ) | /PP | 480 | 7 | 1 |
| Example 7-3 | PP/ | maleinated SIS (1μ) | /PP | 607 | 25 | 20 |
| Example 7-4 | PP/ | maleinated SBS (1μ) | /PP | 595 | 22 | 21 |

EXAMPLE 8

60 g of a styrene-butadiene-styrene block copolymer prepared in a benzene solution in the presence of a n-butyl lithium catalyst and having a butadiene/styrene weight ratio of 67.5/32.5 and $\eta_{sp}/C$ of 0.59 dl/g in toluene at a concentration of 4 g/l at 25° C., and 1.7 l of toluene were charged into a 2-l separable flask. The reaction mixture was heated to 90° C. in a nitrogen atmosphere to obtain a solution of the block copolymer. To this solution were added 4.5 g of maleic anhydride and then 0.3 g of benzoyl peroxide, and the mixture was allowed to react for 4 hours.

The solution thus obtained was poured into methanol to precipitate the resulting polymer.

The polymer thus precipitated was divided into two portions, to one of which a small quantity of a phenol antioxidant was added, and the mixture was then subjected to vacuum drying at 45° C., whereupon a maleinated SBS [A] having a maleinated anhydride content of 2.7% was obtained.

The other half of the maleinated SBS was maintained in methanol for 16 hours while methanol was refluxed. Thereafter, a small quantity of a phenol antioxidant was added, and the mixture was subjected to vacuum drying to obtain a half ester type maleinated SBS (methyl ester) [B]. This copolymer [B] was found by its infrared absorption spectra to have three forms of carbonyl groups, i.e., 1780 cm$^{-1}$ (carbonyl group in the form of anhydride), 1740 cm$^{-1}$ (carbonyl group in the form of methyl ester), and 1710 cm$^{-1}$ (carbonyl group in —COOH). The analysis of the infrared spectra revealed that the acid content in the form of a half ester in [B] was about 70% of the acid content in the form of anhydride in [A]. The melt viscosities of the copolymers [A] and [B] at 175° C. under a shearing stress of $4 \times 10^6$ dyne/cm$^2$ were $2.0 \times 10^4$ poise and $8.0 \times 10^3$ poise, respectively.

Laminar sheets as shown in Table 7 were prepared in the same manner as in Example 1 by interposing as bonding layers these modified SBS's and the unmodified SBS, as a control, between layers of vinylidene chloride-vinyl chloride copolymers (the same as those of Example 1) or polypropylene (the same as that of Example 1).

The peeling strengths of these laminar sheets were measured under the same conditions as in Example 1, whereupon the results set forth in Table 8 were obtained.

The thicknesses of the respective layers of the laminar sheets in Table 8 were as follows;
  PP layer: 400μ
  PVDC layer: 500μ
  Bonding layer: 350μ

TABLE 8

| | Lamination Structure | | | Peeling Strength (g/cm) | | | | | |
|---|---|---|---|---|---|---|---|---|---|
| | | | | 23° C. | 80° C. | 100° C. | 120° C. | 130° C. | 140° C. |
| Control 8-1 | PVDC/ | unmodified SBS | /PVDC | 800 | — | 50 | 20 | — | — |
| Example 8-1 | PVDC/ | maleinated SBS[A] | /PVDC | 3400 | 450 | 120 | 210 | 150 | — |
| Example 8-2 | PVDC/ | maleinated SBS[B] | /PVDC | 3000 | 500 | 420 | — | 200 | — |
| Control 8-2 | PP/ | unmodified SBS | /PP | 700 | 80 | 25 | 10 | — | — |
| Example 8-3 | PP/ | maleinated SBS[A] | /PP | 800 | 450 | 135 | 95 | — | 215 |
| Example 8-4 | PP/ | maleinated SBS[B] | /PP | 1000 | 520 | 100 | 200 | — | 210 |

EXAMPLE 9

20 g of SBS used in Example 3 (manufactured by Shell Chemical Co. under the trade name "Califlex TR-1102") and 2 g of citraconic anhydride (methylmaleic anhydride) were dissolved in 500 g of toluene. The reaction mixture was heated to 90° C. to which 0.2 g of benzoyl peroxide was added, and the resulting mixture was allowed to react for 4 hours.

25 ml of the solution thus obtained was separated, and subjected to post-treatments in the manner described in Example 1, whereupon a modified SBS having a maleic anhydride content (citraconic acid content calculated in terms of wt % as maleic anhydride) of 0.8% was obtained.

To the remaining solution was added 130 ml of a dimethylformamide solution containing 100 mg of zinc acetate (dihydrate), and the resulting solution was agitated for 3 hours at 80° C. The reaction product solution was subjected to post-treatments under the same conditions as in Example 1 to obtain an citraconic acid-modified and ionically crosslinked SBS. The melt viscosity of this modified SBS at 175° C. under a shearing stress of $4.0 \times 10^6$ dyne/cm$^2$ was $3.1 \times 10^4$ poise.

Laminar sheets as shown in Table 9 were prepared in the same manner as in Example 1 by interposing as bonding layers this modified SBS and an unmodified SBS as a control between layers of polypropylene (the same as that of Example 1).

The peeling strengths of these laminar sheets were measured by the procedure of Example 1 at varying temperatures. The results obtained are shown in Table 9.

In the laminar structures in Table 9, the polypropylene layer had a thickness of 400μ and the bonding layer had a thickness of 350μ.

TABLE 9

| | Lamination Structure | | | Peeling Strength (g/cm) | | | |
|---|---|---|---|---|---|---|---|
| | | | | 23° C. | 80° C. | 100° C. | 120° C. |
| Example 8-1 | PP/ | maleinated SBS | /PP | 2300 | 500 | 200 | 60 |
| Control 8-1 | PP/ | unmodified SBS | /PP | 2300 | 600 | 140 | 10 |

What is claimed is:

1. A laminar thermoplastic resin structure comprising a plurality of thermoplastic resin layers, at least one adjacent pair of which is bonded to a layer of an ionically cross-linked maleinated block copolymer of a conjugated diene and an aromatic vinyl monomer having a maleic anhydride content of 0.1 to 10% by weight and said maleinated block copolymer being ionically cross-linked to a metal compound selected from the group consisting of oxides, hydroxides, organic acid salts and alkoxides of mono- or divalent metals, said thermoplastic resin layers bonded to a layer of the maleinated block copolymer comprising at least one resin selected from the group consisting of polyvinylidene chloride resins, polyvinyl chloride resins, polyolefin resins, polyamide resins, polyester resins, polycarbonate resins and unsaturated nitrile resins.

2. The laminar thermoplastic resin structure according to claim 1, in which said maleinated block copolymer of a conjugated diene and an aromatic vinyl monomer is selected from the group consisting of a mixture of 100 parts by weight of:

(i) a reaction product of a maleic anhydride compound and a first block copolymer having an aromatic vinyl content of 10 to 70% by weight selected from the group consisting of copolymers having the formula (A-B)$_{\overline{m}}$A, copolymers having the formula (A-B)$_n$X and mixtures thereof, wherein A is a polymerized block of aromatic vinyl monomer and B is a polymerized block of conjugated diene, m is 1 or 2, n is an integer of from 2 to 8, and X is a polyfunctional group binding n(A-B) chains at their B terminals, said maleic anhydride compound being represented by wherein R is hydrogen, a methyl group or a phenyl group;

(ii) free carboxylic derivatives of product (i) or (iii) half esters of product (i) or (ii) with an alcohol; and up to 10 parts by weight of said metal compound.

3. The laminar thermoplastic resin structure according to claim 1, in which at least one layer of said at least one adjacent pair of layers bonded with a layer of said maleinated block copolymer is a poly-unsaturated nitrile resin selected from the group consisting of copolymers of nitrile monomers and other monomers copolymerizable therewith, rubber-graft copolymers obtained by graft-polymerizing a monomer mixture which provides said nitrile copolymers onto rubber polymers, and blends thereof.

4. The laminar thermoplastic resin structure according to claim 1, in which said maleinated block copolymer has a melt viscosity of $1.0 \times 10^3$ to $1.0 \times 10^5$ poise at 175° C. under a shearing stress of $4.0 \times 10^6$ dyne/cm$^2$, and a maleic anhydride content of 0.2 to 8% by weight.

5. The laminar thermoplastic resin structure according to claim 1, in which said first block copolymer is a block copolymer of a conjugated diene selected from the group consisting of butadiene, isoprene and 2,3-dimethylbutadiene, and an aromatic vinyl monomer selected from the group consisting of styrene, vinyltoluene, tertiary butyl styrene and vinyl naphthalene.

6. The laminar thermoplastic resin structure according to claim 5, in which said first block copolymer is a block copolymer of butadiene or isoprene and styrene.

7. The laminar thermoplastic resin structure according to claim 1, in which the layer of said maleinated block copolymer has a thickness of 0.1 to 1000 μm.

* * * * *